United States Patent [19]

Sakurai et al.

[11] Patent Number: 5,285,444
[45] Date of Patent: Feb. 8, 1994

[54] MULTI-STAGE LINK SWITCH

[75] Inventors: Yoshito Sakurai; Shinobu Gohara, both of Yokohama, Japan

[73] Assignee: Hitachi, Ltd., Tokyo, Japan

[21] Appl. No.: 960,273

[22] Filed: Oct. 13, 1992

Related U.S. Application Data

[63] Continuation of Ser. No. 569,026, Aug. 17, 1990, abandoned.

[30] Foreign Application Priority Data

Feb. 9, 1990 [JP] Japan .................. 2-030939

[51] Int. Cl.$^5$ .............................................. H04L 12/56
[52] U.S. Cl. .................... 370/60; 340/825.8
[58] Field of Search ........................ 370/60.1, 94.2

[56] References Cited

U.S. PATENT DOCUMENTS

| | | | |
|---|---|---|---|
| 4,907,220 | 3/1990 | Rau et al. | 370/94.1 |
| 4,965,788 | 10/1990 | Newman | 370/60 |
| 4,969,149 | 11/1990 | Killar et al. | 370/60 |
| 4,970,505 | 11/1990 | Hirata et al. | 340/825.8 |
| 4,993,018 | 2/1991 | Hajikano et al. | 370/60 |

FOREIGN PATENT DOCUMENTS 0366866 5/1990 European Pat. Off. ............ 370/60.1

*Primary Examiner*—Benedict V. Safourek
*Assistant Examiner*—Hassan Kizou
*Attorney, Agent, or Firm*—Antonelli, Terry, Stout & Kraus

[57] ABSTRACT

A multi-stage link switch includes first, second and third switch elements, each of the first, second and third switch elements having a predetermined plurality of incoming terminals and a predetermined plurality of outgoing terminals. Communication information is switched between a plurality of incoming highways and a plurality of outgoing highways based on information in each of a plurality of cells. Each cell has fixed length and is transmitted by each of the incoming highways to the plurality of outgoing highways. The multi-stage link switch includes a primary stage including a plurality of the first switch elements, each input terminal of each first switch element is connected to a corresponding one of the input highways, an intermediate stage including a plurality of the second switch elements, each input terminal of each of the second switch elements is being connected to a corresponding one of the output terminals of a corresponding one of the first switch elements of the primary stage, and a last stage including a plurality of the third switch elements, each input terminal of each of the third switch elements being connected to a corresponding one of the output terminals of a corresponding one of the second switch elements in the intermediate stage. Each outgoing terminal of each of the third switch elements is connected to a corresponding one of the outgoing highways.

5 Claims, 8 Drawing Sheets

| INPUT | | | | OUTPUT | | |
|---|---|---|---|---|---|---|
| CN | EMP1 | EMP2 | EMP3 | C1 | C2 | C3 |
| 01 | 0 | 1 | d | 0 | 1 | 0 |
|  | 0 | 0 | 1 | 0 | 0 | 1 |
| 10 | d | 0 | 1 | 0 | 0 | 1 |
|  | 1 | 0 | 0 | 1 | 0 | 0 |
| 11 | 1 | d | 0 | 1 | 0 | 0 |
|  | 0 | 1 | 0 | 0 | 1 | 0 |
| dd | 1 | 1 | 1 | 0 | 0 | 0 | d: DON'T CARE

MULTI-STAGE LINK SWITCH

This application is a continuation of application Ser. No. 569,026, filed on Aug. 17, 1990 now abandoned.

BACKGROUND OF THE INVENTION

The present invention relates to an information communication equipment, particularly to a speech path switch in which a so-called asynchronous transfer mode (ATM) exchange performs a switching operation by use of a fixed-length packet which is composed of an information or data portion including communication information and a header portion including routing information. The present invention relates more particularly to a multi-stage link switch which is suitable for realization of a large scale switch by the combination of a plurality of switch elements.

In order, to construct a large scale speech path switch, a multi-stage link switch is often used in which switch elements each having a certain scale are multi-stage connected. One article relevant to such a technique is "STUDIES OF LARGE SCALE INTEGRATION OF ATM SWITCH", Electronics, Information and Communication Engineers of Japan, Proceedings B-198 of Autumn National Congress, 1989.

In general, a multi-stage link switch employs a system in which the number of internal links or the internal link speed or rate is increased in order to reduce internal blocking. For example, as shown in FIG. 2, m-incoming/r-outgoing (m×r) switch elements generating switching operation between m incoming lines connected to m incoming highways of the link switch and r (m<r) outgoing lines, m-incoming/m-outgoing (m×m) switch elements generating switching operation between m incoming lines and m outgoing lines and r-incoming/m-outgoing (r×m) switch switching elements generating a switching operation between r incoming lines and m outgoing lines connected to m outgoing highways of the link switch are connected in a three-stage configuration so as to form an $m^2$-incoming/$m^2$-outgoing ($m^2/m^2$) switch which has $m^2$ incoming highways and $m^2$ outgoing highways and in which the internal link is extended.

Further, in an ATM switch in which the statistical multiplexing of fixed-length packets is performed and in which the internal link rate is increased to nv corresponding to n times higher than the incoming/outgoing highway rate v, prevents blocking which is caused by a fractional line effect. The number of internal links and the internal link rate are complementary to each other, and hence an equivalent effect can be obtained from either one or both of the number of internal links and the internal link rate.

The condition of non-blocking of a speech path switch in the ATM exchange or numerical values for the non-blocking are described in details by U.S. Pat. No. 4,910,731 to the present inventors issued on May 20, 1990.

An example of applications of the above non-blocking condition is shown in FIG. 3. In the shown three-stage link switch, no blocking occurs for an input call having the rate of the source of the call up to v/3, wherein v is the incoming/outgoing highway rate.

One of configurations of a switch element of the speech path switch in the ATM exchange is known a shared buffer memory type switch element which is described by, for example, the U.S. Pat. No. 4,910,731 referred to in the above. This type of switch element is suitable for large scale integration since the memory utilization efficiency is high.

However, in the case where a multi-stage link switch as shown in, for example, FIG. 3, is constructed by use of the shared buffer memory type switch elements, three kinds of switch elements including an m-incoming/3m-outgoing (m×3m) element an m-incoming/m-outgoing (m×m) element and a 3m-incoming/m-outgoing (3m×m) element, m being an integer are required. An ideal condition is to integrate the switch elements on one chip. In the above case, however, three different kinds of LSI's are necessary. This problem exists not only in the case where the shared buffer memory type switch elements are used but also in the case where the other type switch elements are used.

Also, there is a problem that the last stage of the multi-stage link switch has a complicated construction because it requires a concentration function.

SUMMARY OF THE INVENTION

An object of the present invention is to provide a multi-stage link switch in which identical switch elements are used, and the internal link is extended.

Another object of the present invention is to provide a multi-stage link switch in which the throughput is not lowered even at the last stage.

To attain the above object, the present invention provides a multi-stage link switch for switching between first, second and third switch elements, each of the first, second and third having a predetermined plurality of incoming terminals and a predetermined plurality of outgoing terminals. The switch elements are multistage-connected. Communication information is switched between a plurality of incoming highways and a plurality of outgoing highways by use of informations contained in cells. Each cell is of a fixed length and is inputted from each of the incoming highways. Each cell is composed of a header portion and a data portion including communication information. The switching is performed on the basis of information included in the header portion of the cell. The multi-stage link switch includes a primary stage including a plurality of the first switch elements, the corresponding incoming terminals of the first switch elements being commonly connected to the corresponding one of the incoming highways, an intermediate stage including a plurality of the second switch elements, each of the incoming terminals of each of the second switch elements being connected to one of the outgoing terminals of the corresponding one of the first switch elements of the primary stage, and a last stage including a plurality of the third switch elements, each of the incoming terminals of each of the third switch elements being connected to one of the outgoing terminals of the corresponding one of the second switch elements in the intermediate stage. The corresponding outgoing terminals of the third switch elements are commonly connected to the corresponding one of the outgoing highways.

Namely in the primary stage of the multi-stage link switch of the present invention, the corresponding incoming terminals of the plurality of switch elements therein are multi-connected to the corresponding one of the incoming highways. In the intermediate stage, each of the incoming terminals of each of the plurality of switch elements therein is connected to the corresponding outgoing terminal of the primary stage. In the last stage, the corresponding outgoing terminals of the plurality of switch elements therein are multi-connected to the corresponding one of the outgoing highways and each of the incoming terminals of each switch element therein is connected to the corresponding outgoing terminal of the intermediate stage.

Preferably, each switch element is provided with incoming and outgoing terminals or lines which are the same in number. Each switch element has for each of the outgoing lines thereof a function of transmitting information of the presence/absence of a cell in a queue state. Also, the switch element used in the last stage is provided with an adjuster (or arbiter) for receiving information of the presence/absence of a queue cell from a plurality of switch elements in the last stage which are multi-connected to determine or control which one(s) of the switch elements from which a cell should be read.

In the primary stage, different outgoing highway numbers are respectively allotted to the switch elements which are multi-connected. Therefore, each switch element ignores any input cell having an outgoing highway number other than the outgoing highway number allotted to itself, thereby permitting the distribution to the extended internal link.

The intermediate stage can be formed by increasing the number of switch elements to be used in this stage by the increased proportion of the internal links. Therefore, no special contrivance is required.

In the last stage, a concentration function is realized by reading the multi-connected switch elements in order. However, if the multi-connected switch elements are read in mere order, the throughput of the last stage is lowered since an empty or idle switch element having no cell in a queue state may be read as in the case where there is an unbalance in the amount of queue cells between switch elements. Therefore, the last stage may include an arbiter which receives, from each switch element, information relating to the presence/absence of a queue cell for each outgoing line thereof. When a queue cell is absent from a certain outgoing line of a certain switch element, the arbiter instructs to promptly or forcibly read a queue cell at one of the outgoing lines of the other switch elements which corresponds to the certain outgoing line of the certain empty switch element and is connected in common with the certain outgoing line to the same outgoing highway. Thereby, lowering of the through-put can be prevented since there is avoided an inconvenience of an operation of reading from any empty switch element having no queue cell when a switch element having a queue cell to a certain outgoing highway exists.

DESCRIPTION OF THE PREFERRED EMBODIMENTS

Embodiments of the present invention will now be explained by use of the accompanying drawings.

Figure 1:
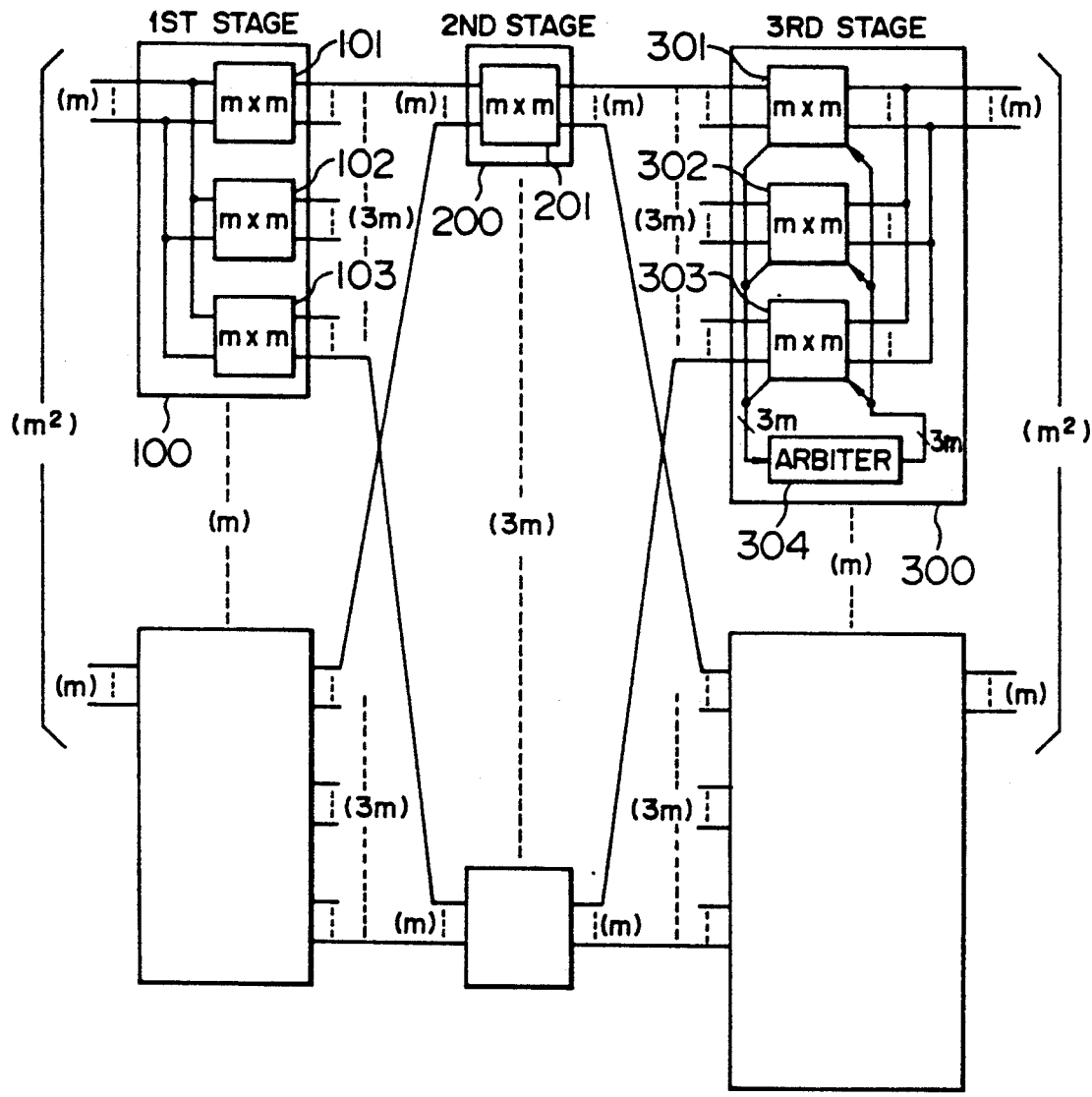
FIG. 1 is a block diagram showing the construction of an embodiment of a multi-stage link switch according to the present invention.
Figure 3:
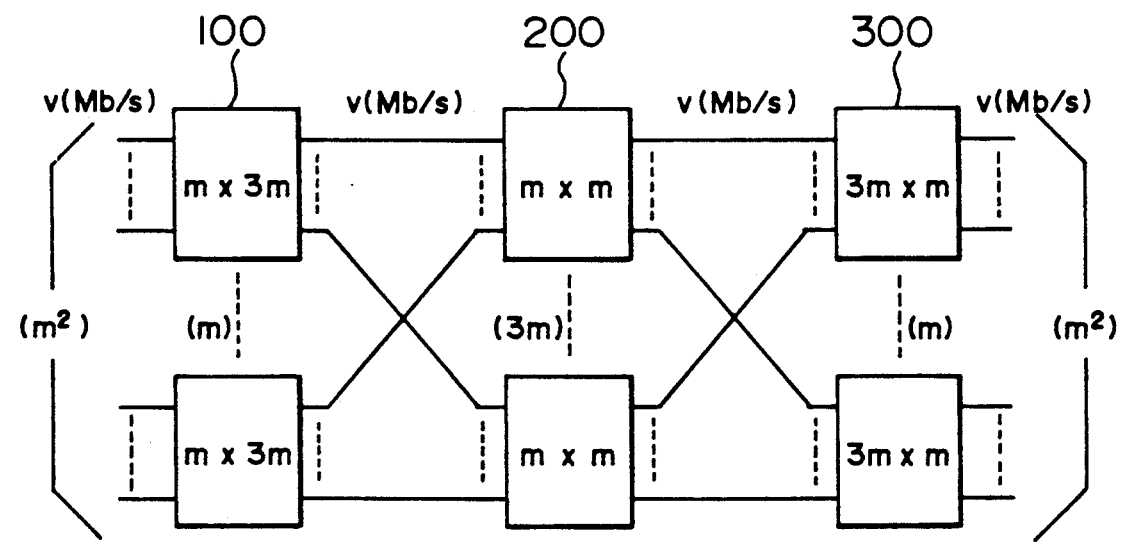

FIG. 1 is a block diagram showing the construction of a three-stage link switch as an embodiment of a multi-stage link switch according to the present invention, in which the present invention is applied to the multi-stage link switch having such a construction as shown in FIG. 3.

The three-stage link switch in the present embodiment is provided with an $m^2$-incoming/$m^2$-outgoing ($m^2 \times m^2$) multi-stage link construction in which the link switch has $m^2$ incoming highways, $m^2$ outgoing highways and m switch units 100 in a first stage, km switch units 200 in a second stage and m switch units 300 in a third stage are connected, wherein k is an integer. (In the shown example, k is 3 and hence the numbers of the switch units in the second stage is 3 m.) Accordingly, a cell inputted from any incoming highway of the link switch can select one of 3 m internal links.

It is needless to say that the number of stages and the number of links in a multi-stage link switch to which the present invention is applied is not limited to this embodiment.

Each switch unit 100 in the first stage is connected to m corresponding incoming highways of the link switch or accommodates m incoming lines (or terminals) and 3 m outgoing lines (or terminals). Each switch unit 100 includes three m-incoming/m-outgoing (m × m) switch elements 101, 102 and 103, each of which has incoming lines or terminals and m outgoing lines or terminals. Each of the incoming lines of each of the switch elements 101, 102 and 103 is multi-connected to the corresponding incoming lines of the two other switch elements.

Each switch unit 200 of the second stage consists of one m-incoming/m-outgoing (m × m) switch element 201. Each incoming line of each switch element in the second stage is connected to one outgoing line of the corresponding switch unit in the first stage, and each outgoing line thereof is connected to one incoming line of the corresponding switch unit in the third stage.

Each switch unit 300 of the third stage accommodates 3 m incoming lines and m outgoing lines. Each switch unit 300 includes three m-incoming/m-outgoing (m × m) switch elements 301, 302 and 303 and one arbiter (or adjuster) 304. The outputs of the switch elements 301, 302 and 303 are multi-connected (or combined in a wired-OR form of a three-state output) to each outgoing highway. Namely, the m outgoing lines of each of the switch elements 301, 302 and 303 are connected to the m corresponding outgoing highways of the link switch. Also, each of the switch elements 301, 302 and 303 outputs m empty (EMP) signals supplying information of the presence/absence of the queue state of a cell for each outgoing line of that switch element. The number of the EMP signals outputted from the three switch elements 301, 302 and 303 is 3 m in total. These EMP signals are inputted to the arbiter 304. The arbiter 304 outputs three cell enable (CEN) signals indicating which one of the three switch elements 301, 302 and 303 a cell should be read from.

Figure 4:
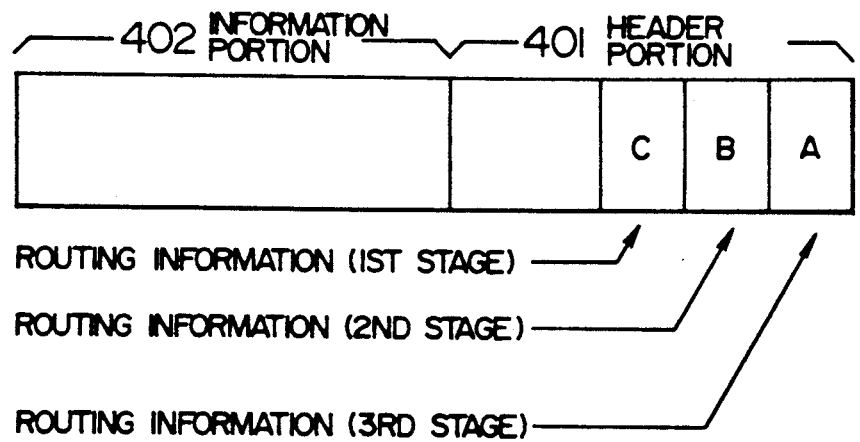
FIG. 4 shows an example of the format of a cell.

FIG. 4 shows an example of the format of a cell of the present embodiment.

The cell is composed of a header portion 401 and an information or data portion 402. The header portion 401 includes routing information A, B and C of the respective stages. The switch element in each stage routes the cell in accordance with the corresponding routing information.

Figure 5:
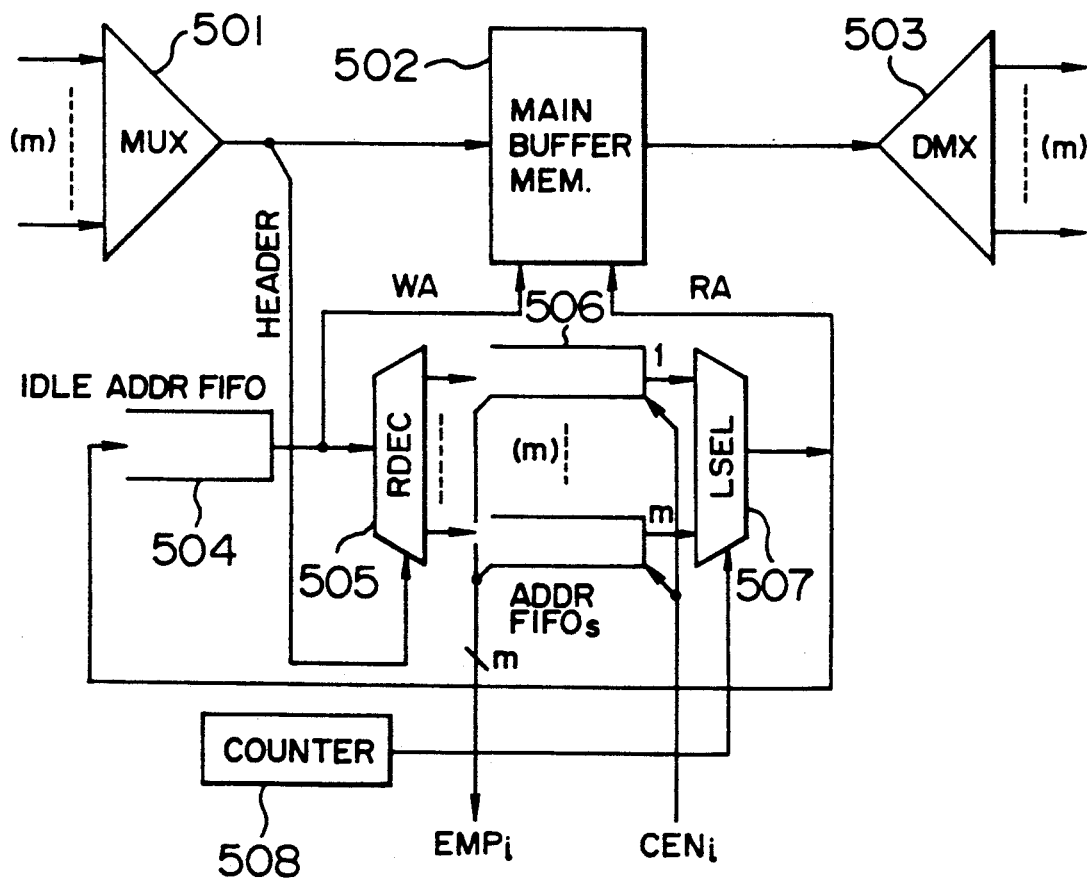
FIG. 5 is a block diagram showing the construction of an example of a switch element used in the embodiment shown FIG. 1.

FIG. 5 shows the construction of an example of the switch element which is preferably used in the present, embodiment. Detailed explanation of the illustrated switch element and other examples of a switch element are disclosed by the U.S. Pat. No. 4910731 referred to in the above. The switch elements disclosed by this U.S. patent can be used in the present invention. The switch element shown in FIG. 5 will now be explained.

The switch element includes a series-parallel conversion multiplexer (hereinafter abbreviated to MUX) 501 for multiplexing m incoming lines, a main buffer memory 502, a parallel-series conversion demultiplexer (hereinafter abbreviated to DMX) 503, an empty address memory such as a first-in first-out memory (FIFO) 504, a route decoder (RDEC) 505, m address FIFO's 506 provided corresponding to m outgoing lines, an outgoing line selector (LSEL) 507, and a counter 508.

Inputted cells are multiplexed by the MUX 501 and is written into the main buffer memory 502. On the other hand, read cells are demultiplexed for respective outgoing lines by the DMX 503.

A control for writing a cell is described next. After multiplexing, a header of the cell is extracted as a control signal of the route decoder 505. A write address (WA) is fetched from the empty address FIFO 504. The fetched write address is sent to the main buffer memory 502 and is also stored as a read address through the route decoder 505 into one of the address FIFO's 506 which corresponds to routing information (or an outgoing line number) included in the header of the cell and decoded by the route decoder 505.

On the other hand, a control for reading of the cell is described next. Namely, the counter 508 cyclically outputs values of 1 to m and transmits them to the selector 507 to control selector 507. Accordingly, the contents of the read address FIFO's 506 corresponding to the outgoing lines corresponding to the output values of the counter 508 are read in order and the value which was read (or address) serves as a read address (RA) of the main buffer memory 502. At the same time, this address is returned to the empty address FIFO 504.

Thus, the write control and the read control are controlled in such a manner that write addresses and read addresses are respectively arranged in a chain-wise manner corresponding to each outgoing line to form a so-called address chain, and a switching operation based on the routing information included in the cell header is executed. Each address FIFO 506 includes an input terminal of the CEN signal for stopping the read of an address from this FIFO and an output terminal of the EMP signal for outputting the empty information of the address of this FIFO 506.

At least a part of the components of the switch element, for example, the main buffer memory 502, the empty address FIFO 505 and the m address FIFO's 505 may be integrated with an IC configuration on the same chip. Such a construction is preferable from the viewpoint of miniaturization. Also, if the greater number of the components of the switch element are integrated with an IC configuration into one chip, the switch element can be handled as a single part. Accordingly, it is possible not only to make the construction of the multi-stage link switch simple or convenient but also to miniaturize the multi-stage link switch.

Figures 6, 8:
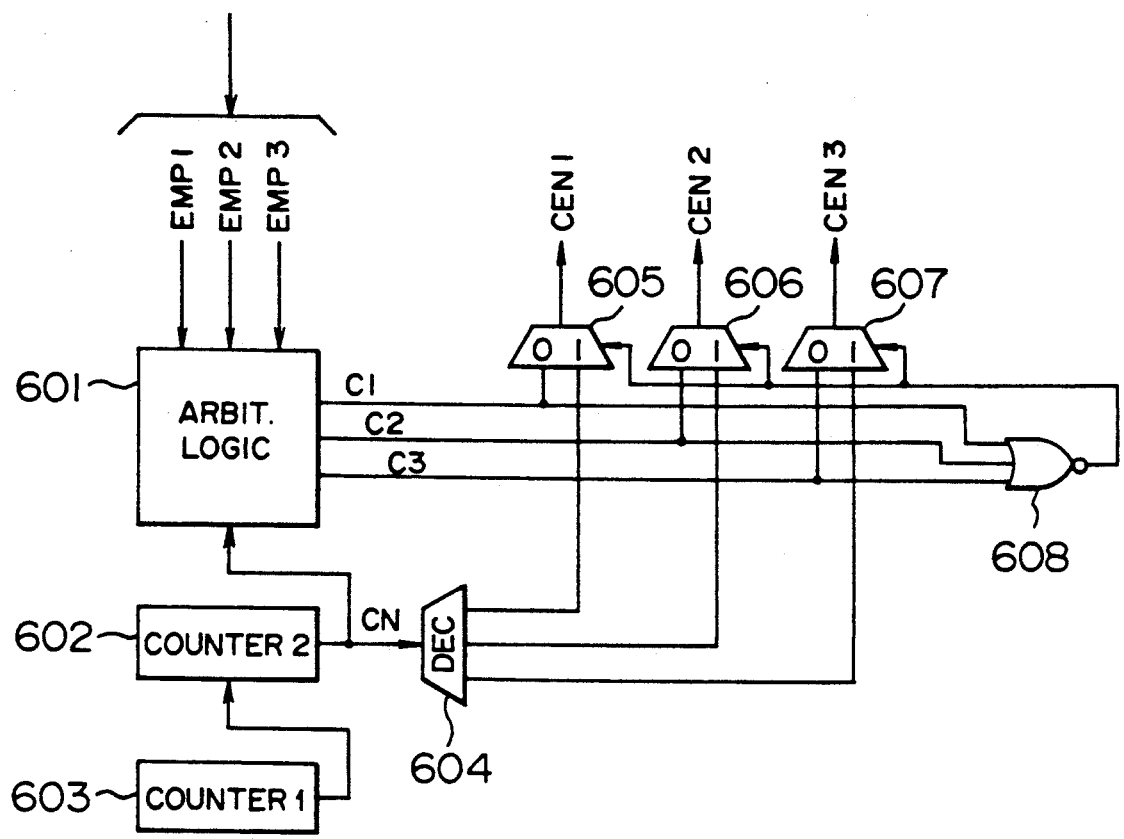
FIGS. 6 and 7 are block diagrams showing the construction of an example of an arbiter (or adjuster) included in the embodiment shown in FIG. 1.
FIG. 8 is a truth, table of an arbitration logic shown in FIG. 6.
Figure 7:
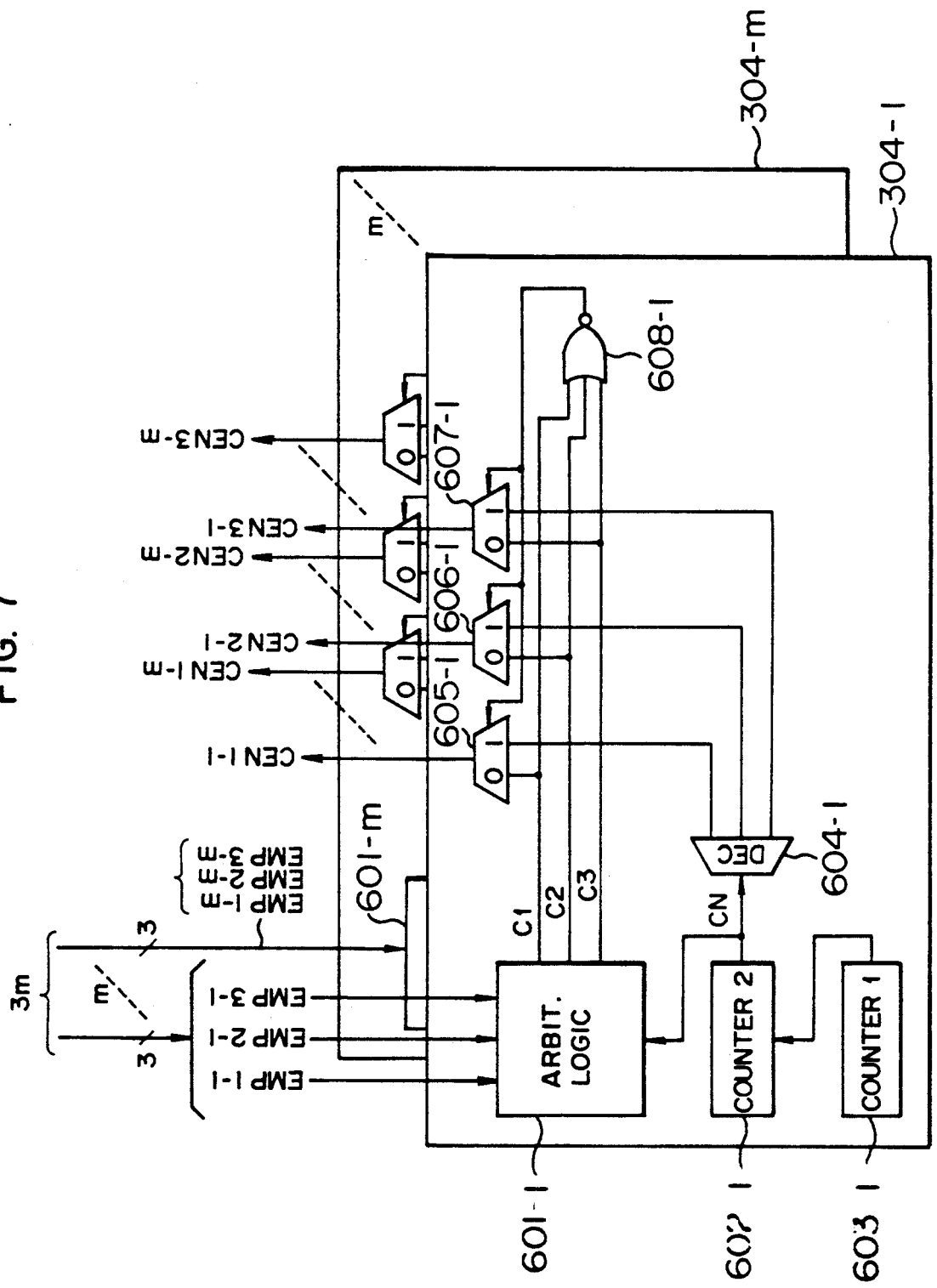

FIG. 6 is a block diagram illustrating arbiter 304 of the memory unit 300 shown in FIG. 1. Actually, as shown in FIG. 7, m arbiters 304-1 to 304-m, each having a construction shown in FIG. 6, are multiplexed corresponding to the number m of the outgoing highways. Explanation of the construction of an arbiter corresponding to one of the m outgoing highways will be made herein by reference to FIG. 6.

Referring to FIG. 6, the arbiter 304 in the present embodiment includes an arbitration logic 601, counters 602 and 603, a decoder 604, selectors 605 to 607 and a NOR gate circuit 608.

The counter 603 is a scale-of-m (or m-system) counter which is synchronous with the reading of a cell from the same switch unit and is synchronous with the counter 508 of each of the switch element in the same switch unit. The counter 603 of any switch unit may be synchronized with the counters 603 of all the other switch units. The counter 602 is a ternary counter which receives a carry output from the counter 603 to designate in order the switch elements 301 to 303 from which the cells are to be read. The decoder 604 receives an output of the counter 602 to indicate by a bit value the switch element from which the cell should be read.

The arbitration logic 601 receives three EMP signals from each switch element and the output from the counter 602 to output signals C1 to C3 for controlling the selection of outputs of the decoder 604, which controls the reading from the switch elements.

The selectors 605 to 607 have their input terminals 0 which are respectively connected to the signals C1 to C3 outputted from the arbitration logic 601 and their output terminals 1 which are respectively connected to the outputs of the decoder 604. The selectors 605 to 607 are controlled by an output of the NOR gate circuit 608. When EMP1=EMP2=EMP3=1, that is, when read addresses are present in all of the FIFO's 506 corresponding to the switch elements, the selectors 605 to 607 select the outputs of the decoder 604 with C1=C2=C3=0 so that "1's" are successively outputted as the CEN1 to CEN3 signals, thereby successively reading the cells from the switch elements 301 to 303. On the other hand, when any one of the EMP1 to EMP3 signals is not "0", that is, when the read address of any one of the FIFO's 506 corresponding to the switch elements 301 to 303 is empty, the selector 605 to 607 successively select the signals C1 to C3 excepting one thereof corresponding to the empty switch element to output them as the CEN1 to CEN3 signals to the switch elements 301 to 303. Here, the level "1" of the CEN signal indicates the permission of read and the level "0" thereof indicates the inhibition of read.

The truth table of logics in the arbiter 304 in the present embodiment is shown in FIG. 8.

In the table shown in FIG. 8, the EMP signal indicates in the case of "0" that the corresponding address FIFO is empty. From the table, it is seen that the CEN signals are not controlled in the case where any address of the FIFO is not empty, and the CEN signals are not controlled except in the case where at least one address of the FIFO's is empty, the CEN signals are controlled so as to forcibly the read from the other switch element(s). More especially, when CN=(01), that is, for example, when the switch element 301 is selected as an element to be read, the EMP1 to EMP3 are (0, 1, d) or the address FIFO corresponding to the selected switch element 301 is empty and hence the signal C1 to the switch element 301 is turned into "0" (or the read from the switch element 301 is inhibited) and thereinstead the signal C2 to the switch element 302 is forcibly turned into "1" (or the read from the switch element 302 is permitted). Similarly, when the EMP1 to EMP3 are (0, 0, 1), the signal C3 to the switch element 303 is forcibly turned into "1" since the switch element 302 as well as the switch element 301 are empty. A similar control is made also when the other switch element is selected by the counter 602, for example, when CN=(01) or (11). The above control enables the read from the switch elements with no waste.

The arbiter 304 in the present embodiment produces an output in a combinational logic. Therefore, when the read address FIFO 506 of one of the switch elements corresponding to a certain outgoing highway is empty, it is possible to instantaneously read a cell of the other switch element corresponding to the same outgoing highway.

Figure 2:
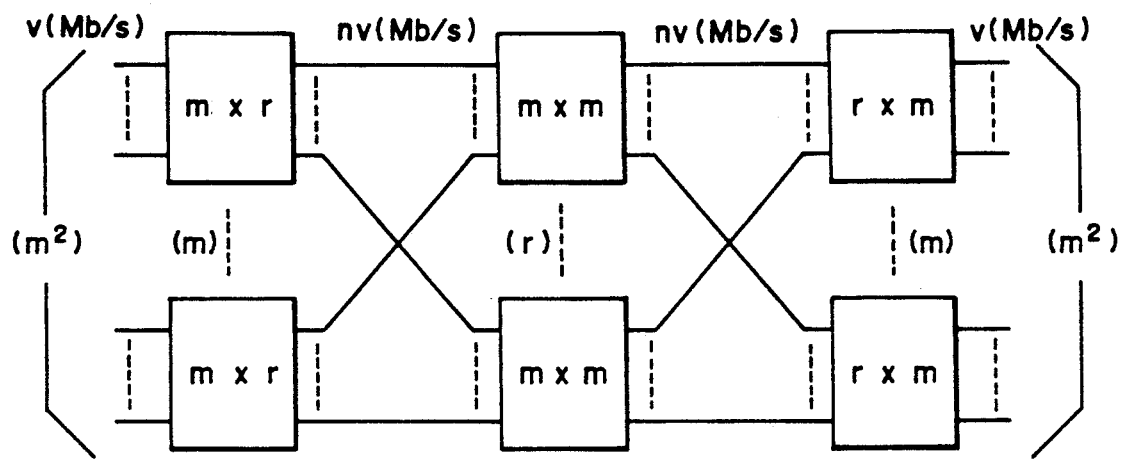
FIGS. 2 and 3 are block diagrams showing the constructions of different examples of the conventional multi-stage link switch.

The EMP signal may be "0" in the case where the corresponding address FIFO 506 has no address stored therein and "1" in the case where it has one address. Also, in the case where as the switch element is used one which is shown in, for example, FIG. 1 of the U.S. Pat. No. 4,910,731, an output of a non-coincidence detector shown in FIG. 3 of the U.S. Pat. No. 4,910,731 may be used as the EMP signal. In this case, as the cell format is used one which is shown in FIGS. 2A to 2C of the U.S. Pat. No. 4,910,731.

Figure 9:
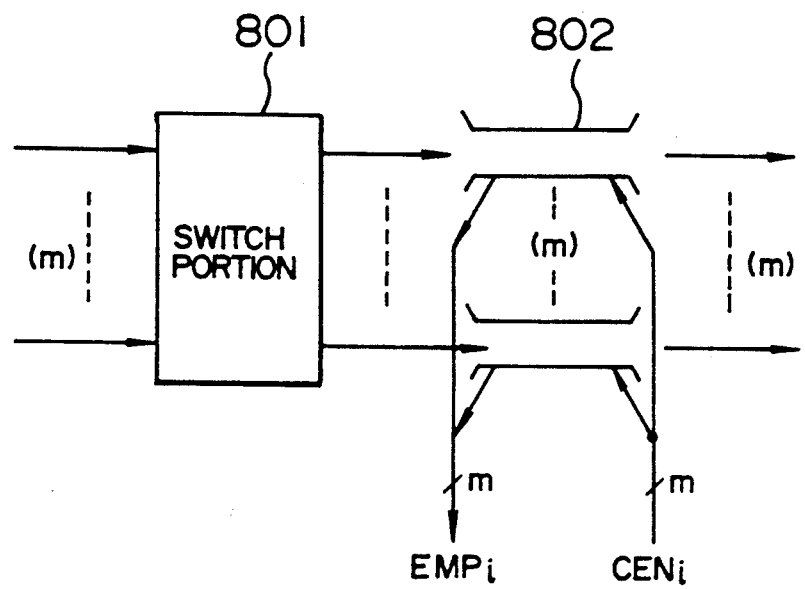
FIGS. 9 and 10 are block diagrams showing other examples of a switch element.
Figure 10:
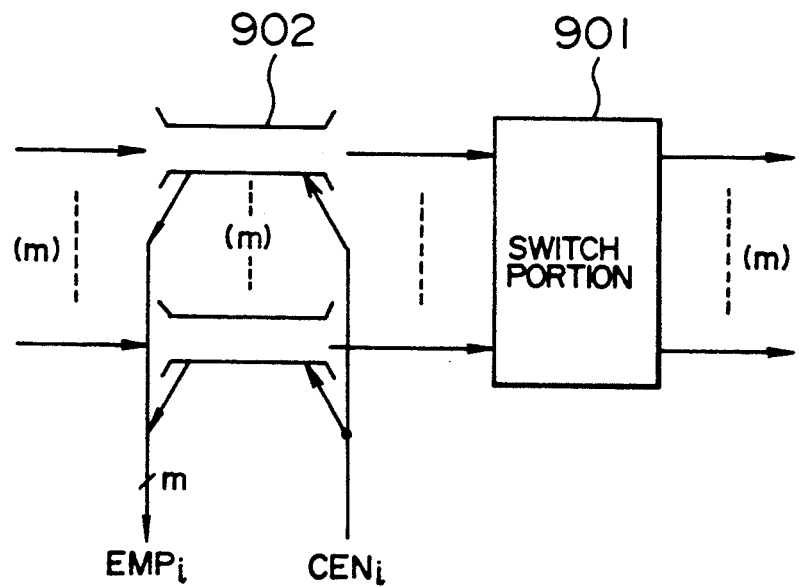

FIGS. 9 and 10 show the other examples of the construction of the switch element. Though the example shown in FIG. 5 is an example of a so-called shared buffer memory type, the examples shown in FIGS. 9 and 10 are an output buffer memory type switch element and an input buffer memory type switch element, respectively.

In FIG. 9, a switch portion 801 has m incoming lines and m outgoing lines. The m outgoing highways are connected to m memories, for example, FIFO buffers 802, respectively. Respective outputs of the m FIFO buffers 802 provide the outgoing lines. The switch portion 801 has a cell switching function and can be realized by a bus type switch, a matrix type switch, a Batcher-Banyan type switch or the like.

The switch portion 801 has no buffering effect and the FIFO buffers 802 are provided corresponding to the respective outgoing lines in order to avoid a congestion state in the case where cells are concentrated onto a specific outgoing line. In order to avoid the collision of cells with each other in the switch portion 801, the operating rate of the switch portion 801 is made sufficiently high as compared with the transfer rate of the incoming line.

Also in the output buffer memory type switch element shown in FIG. 9, an input terminal of a CEN signal for stopping the reading from the FIFO buffer 802 and an output terminal of an EMP signal for causing empty information of the FIFO buffer 802 are provided, like the example shown in FIG. 5. In the example of FIG. 5, since it is of a shared buffer memory type, the above function is provided to the address FIFO in which a read address of the main buffer memory. In the example shown in FIG. 9, on the other hand, this function is generated by the FIFO buffer 802, which buffers the output cell itself.

It is apparent that the multi-stage link switch shown in FIG. 1 can be constructed by use of the switch element shown in FIG. 9.

The example shown in FIG. 10 shows an input buffer memory type switch element in which the switching function and the buffering function are inverted in the arrangement. Such a switch element is shown in, for example, FIG. 13 of the U.S. Pat. No. 4,910,731.

In the example shown in FIG. 10, FIFO buffers 902 are provided corresponding to incoming lines, the outputs of the FIFO buffers 902 are respectively connected to inputs of a switch portion 901 and the outputs of the switch portion 901 provide outgoing lines, respectively. Also in this example, an EMP signal terminal and a CEN signal terminal may be provided to the FIFO buffer 920, thereby giving a function similar to that in FIG. 8.

It is apparent that the multi-stage link switch shown in FIG. 1 can be constructed by use of the switch element shown in FIG. 10.

Figure 11:
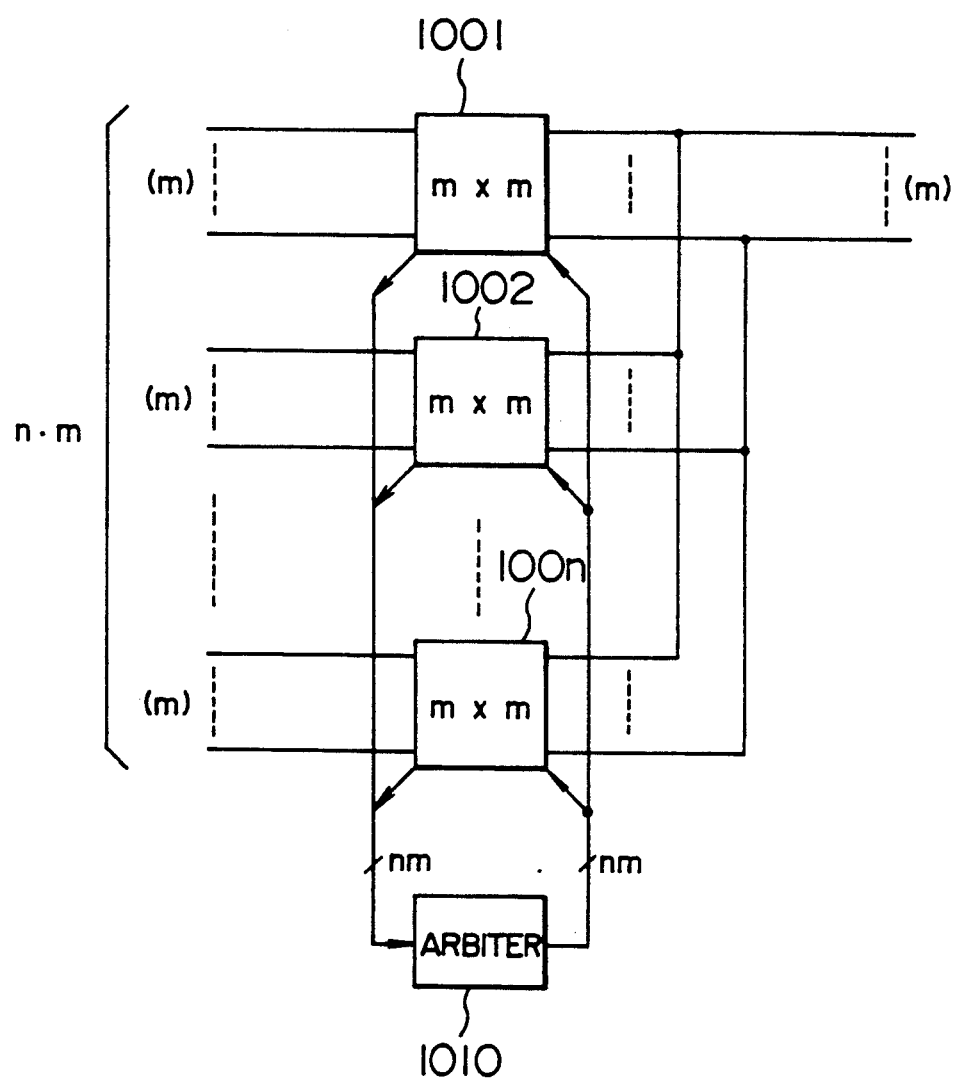
FIG. 11 is a block diagram showing an embodiment of a speech path switch to which the present invention is applied.

FIG. 11 shows the construction of another embodiment of the present invention. More particularly, FIG. 11 shows a switch unit in the third stage of a multi-stage link switch, in which the number of the m-incoming/m-outgoing (m×m) switch elements of the switch unit 300 of the third stage in the construction shown in FIG. 1 is not limited to 3 as in FIG. 1 but may be an arbitrary integer n, and one arbiter 1010 is used in such a switch unit. Though the functional operation of the switch unit in the present embodiment is similar to that of the switch unit 300 in the third stage in FIG. 1, explanation thereof will be omitted.

In the case where each switch unit 300 in the third stage is thus constructed by n m-incoming/m-outgoing (m×m) switch elements, each switch unit 100 in the first stage is constructed by n m-incoming/m-outgoing (m×m) switch elements, and the number of the m-incoming/m-outgoing (m×m) switch elements 201 in the second stage is nm.

The switch unit 300 in the present embodiment performs the function of a concentrator which concentrates and switches n×m incoming lines into m outgoing lines. Accordingly, this switch can be used as, for example, a remote concentrator placed remotely from a switching station. As another example, this switch can be used as a private branch exchange (PBX) in which the incoming line side of the switch unit 300 serves as an extension side, and the concentrated outgoing line side thereof serves as a station highway (or line wire) side.

Though any one of the examples mentioned above in conjunction with FIG. 11 has an upstream switching function (or concentration function), a function in a reverse or upstream direction (or distribution function can be easily provided by multi-connecting the incoming lines of the n m-incoming/m-outgoing (m×m) switch elements as in the switch unit 100 in the first stage as shown in FIG. 1. Namely, the m incoming lines are distributed or switched to the n×m outgoing lines.

Figure 12:
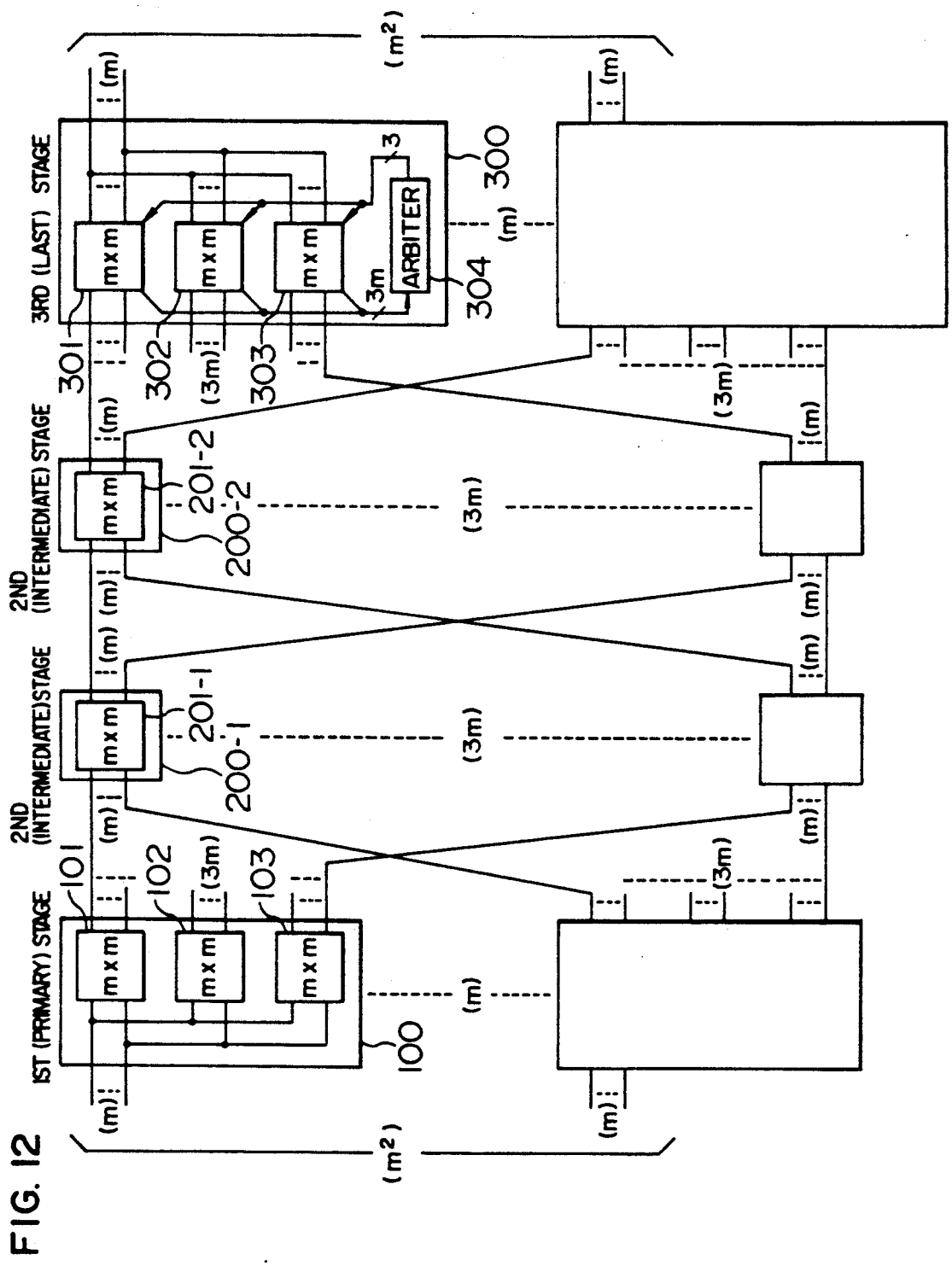
FIG. 12 is a block diagram showing the construction of another embodiment of a multi-stage link switch according to the present invention.

FIG. 12 is a block diagram of a further embodiment of a multi-stage link switch according to the present invention. Though the three-stage link switch has been shown in the embodiment of FIG. 1, the link switch can be constructed in four or more stages. FIG. 12 shows a four-stage link switch by way of example. The primary and last stages have their constructions similar to those of the first and third stages shown in FIG. 1, and an intermediate stage, is formed by two interconnected stages each of which has the same construction as the second stage of FIG. 1. Accordingly, in the case where it is desired to construct an n-stage link switch (n≧3), an intermediate stage thereof may be formed by (n−2) interconnected stages, each of which has the same construction as the second stage of FIG. 1. In the embodiment shown in FIG. 12, each switch unit in the primary and last stages is formed by three switch element, but it may be formed by n switch elements.

In the above embodiments of the multi-stage link switch (shown in FIGS. 1 and 12), each switch element in each of the first or primary and second or intermediate stages has a construction shown in FIG. 5 or may be constructed so as to output an EMP signal and to receive a CEN signal. In that case, the EMP signal may be used for a purpose other than the arbitration since no arbiter is provided in the primary and intermediate stages, and a read enabling signal "1" is always applied as the CEN signal to each switch element in the primary and intermediate stages.

As has been mentioned in the foregoing, in each of the embodiments of the present invention, since any speech path switch such as a multi-stage link switch can be formed by use of a plurality of switch elements having identical constructions, it is possible to increase or decrease the number of switch elements in accordance with the scale required. Accordingly, the present invention can cope with exchanges of a wide range from a large scale exchange to a small scale exchange. Also, since switch elements having identical constructions are used, it is possible to reduce the number of the kinds of parts used in constructing an exchange.

According to the present invention, a multi-stage link switch having the increased number of internal links can be realized by combination of essentially identical switch elements without using switch elements which are different between stages. Accordingly, the repeatability when the switch elements are integrated on one LSI chip is improved. Especially, as for the final or last stage, an arbiter is provided to receive empty information of address FIFO's provided corresponding to outgoing lines and to output information of which one of the switch elements should be read, whereby the last stage can be constructed without lowering the throughput but while possessing a concentration function.

We claim:

1. A multi-stage link switch for switching between a plurality of first, second and third switch elements, each of said first, second and third switch elements having a first predetermined plurality of input terminals and a second predetermined plurality of output terminals, said switch elements being connected in multiple stages, wherein communication information is switched between a plurality of incoming highways and a plurality of outgoing highways by information included in each of a plurality of cells, each cell being of a fixed length and inputted from each of said incoming highways, said cell having a header portion and a data portion including said communication information, said information causing switching being included in the header portion of the cell, comprising:

a primary stage including a plurality of primary stage switch units each including a plurality of said first switch elements, said primary stage switch unit having a plurality of input terminals each connected to one of said incoming highways, each of said input terminals of said primary stage switch unit, being connected to one of said incoming highways, is further connected to one of said input terminals of each of said first switch elements of said primary stage switch unit, said output terminals of said plurality of said first switch elements being provided as output terminals of said primary stage switch unit;

an intermediate stage including said plurality of second switch elements, each of said input terminals of each of said plurality of second switch elements being connected to a corresponding one of said output terminals of a corresponding one of said plurality of said first switch elements of said primary stage switch units of said primary stage; and a last stage including a plurality of last stage switch units each including a plurality of said third switch elements, said last stage switch unit having a plurality of input terminals each being provided by one of said input terminals of said plurality of said third switch elements of said last stage switch unit, each of said input terminals of each of said plurality of said third switch elements of said last stage switch unit is connected to a corresponding one of the output terminals of a corresponding one of said plurality of second switch elements of said intermediate stage, said last stage switch unit having a plurality of output terminals each connected to one of said outgoing highways, each of said output terminals of said each of said plurality of said third switch elements is connected to one of said output terminals of said last switch unit, wherein each third switch element of each last stage switch unit of said last stage includes detection means for detecting whether or not a cell is to be outputted to an output terminal of said third switch element by determining whether said third switch element is in a queued state indicating that said third switch element has a cell to be output, and generating a detection signal for said output terminal of said third switch element, said last stage switch unit further comprising control means for responding to the detection signals from each of said detection means of said plurality of said third switch elements to control output of cells from said plurality of said third switch elements by indicating a third switch element of said plurality of said third switch elements from which a cell is to be output.

2. A speech path switch for an exchange for performing a switching operation of communication information between a plurality of incoming highways and a plurality of outgoing highways in response to routing information included in each of a plurality of cells, each cell having a fixed length, an information portion including the communication information and a header portion including the routing information, comprising:

a switch unit including n switch elements, said switch unit having a plurality of input terminals each connected to one of said incoming highways and a plurality of output terminals each connected to one of said outgoing highways, each of said n switch elements having m input terminals and m output terminals and generating switching operation therebetween, n and m being equal to an integer of at least 2;

means for connecting each of said m input terminals of each of said n switch elements to one of said input terminals of said switch unit; and means for connecting each of said output terminals of each of said n switch elements to one of said output terminals of said switch unit, wherein each switch elements includes detection means for detecting whether or not a cell is to be outputted to an output terminal of said switch element by determining whether said switch element is in a queued state indicating that said switch element has a cell to be output, and generating a detection signal for said output terminal of said switch element, said switch unit further comprising control means for responding to the detection signal from each of said detection means of said n switch elements to control output of cells from said n switch elements.

3. A multi-stage link switch for switching between a plurality of first, second and third switch elements, each of said plurality of first, second and third switch elements having a predetermined plurality of input terminals and a predetermined plurality of output terminals, said switch elements being connected in multiple stages, said multi-stage link switch switches communication information between a plurality of incoming highways and a plurality of outgoing highways in response to information included in each of a plurality of cells, each cell being of a fixed length and inputted from each of said incoming highways, said cell having a header portion and a data portion including communication information, said header portion of the cell including said information which causes switching, comprising:

a primary stage including a plurality of primary stage switch units each including a plurality of first switch elements, said primary stage switch unit having a plurality of input terminals each connected to one of said incoming highways, each of said input terminals of each of said plurality of said first switch elements of said primary stage switch unit is connected to one of said input terminals of said primary stage switch unit, said output terminals of said plurality of said first switch elements being provided as output terminals of said primary stage switch unit;

a plurality of intermediate stages, a first intermediate stage of said plurality of intermediate stages including a plurality of said second switch elements, each of said input terminals of each of said second switch elements of said first intermediate stage being connected to a corresponding one of the output terminals of a corresponding one of said plurality of said first switch elements of said primary stage switch units of said primary stage, each succeeding intermediate stage, other than said first intermediate stage, including a plurality of said second switch elements, each input terminal of each second switch element of each succeeding intermediate stage being connected to a corresponding one of the output terminals of a corresponding preceding intermediate stage; and a last stage including a plurality of last stage switch units each including a plurality of said third switch elements, said last stage switch unit having a plurality of input terminals each provided by one of said input terminals of said plurality of said third switch elements of said last stage switch unit, each of said input terminals of each of said plurality of said third switch elements of said last stage switch unit is connected to a corresponding one of the output terminals of a corresponding one of said second switch elements of a last intermediate stage, said last stage switch unit having a plurality of output terminals each connected to one of said outgoing highways, each of said output terminals of said plurality of said third switch elements is connected to one of said output terminals of said last stage switch unit, wherein each third switch element in each of said plurality of said third switch elements of said last stage switch unit includes detection means for detecting whether or not a cell is to be outputted to an output terminal of said third switch element by determining whether said third switch element is in a queued state indicating said third switch element has a cell to be output, and generating a detection signal for said output terminal of said third switch element, each of said last stage switch units further includes control means for responding to the detection signals from each of said detection means of said plurality of said third switch elements to control output of cells from said plurality of said third switch elements.

4. A multi-stage link switch for switching between each of a plurality of first, second and third switch elements, each of said plurality of first, second and third switch elements having m input terminals and m output terminals, m being an integer of at least 2, said plurality of first, second and third switch elements are connected in multiple stages, communication information of a cell is switched between $m^2$ incoming highways and $m^2$ outgoing highways based on information included in each of a plurality of cells, each cell being a fixed length and received form each of said $m^2$ incoming highways, said cell having a header portion and a data portion including the communication information, said information causing switching being included in the header portion of the cell, comprising:

a primary stage having m first switch units, each of the m first switch units including n first switch elements, each input terminal of each of said n first switch elements being connected to a corresponding one of m incoming highways of said $m^2$ incoming highways, n being an integer of at least 2;

an intermediate stage including nxm second switch elements, each input terminal of each of said nxm second switch elements being connected to a corresponding one of the output terminals of a corresponding one of said first switch elements of a corresponding one of said first switch units of said primary stage; and a last stage having m second switch units, each of the m second switch units includes n third switch elements, each of the input terminals of each of said n third switch elements being connected to a corresponding one of the output terminals of a corresponding one of said second switch elements in said intermediate stage and each output terminal of each of said n third switch elements being connected to a corresponding one of said m outgoing highways of said $m^2$ outgoing highways, wherein each of the n third switch elements in each of said second switch units in said last stage includes detection means for detecting whether or not a cell to be outputted to an output terminals of said third switch element is in a queued state, and generating a detection signal for said output terminal of said third switch element, each second switch unit further includes control means for responding to the detection signal from each of said detection means of said n third switch elements of said second switch unit to control output of cells from said n third switch elements.

5. A multi-stage link switch according to claim 4, wherein each first switch element in each of said first switch units in said primary stage selectively connects a cell inputted from each of the input terminals of said first switch element to a corresponding output terminal of said first switch element.

* * * * *